United States Patent
Samadani

(10) Patent No.: US 8,386,413 B2
(45) Date of Patent: Feb. 26, 2013

(54) SYSTEM FOR GENERATING A MEDIA PLAYLIST

(75) Inventor: Ramin Samadani, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 915 days.

(21) Appl. No.: 12/492,558

(22) Filed: Jun. 26, 2009

(65) Prior Publication Data
US 2010/0332437 A1    Dec. 30, 2010

(51) Int. Cl.
*G06F 9/44*    (2006.01)
*G06N 7/02*    (2006.01)

(52) U.S. Cl. .................. 706/52; 706/45; 706/14
(58) Field of Classification Search .......... None
See application file for complete search history.

(56) References Cited

U.S. PATENT DOCUMENTS

| | | | |
|---|---|---|---|
| 2006/0080356 A1* | 4/2006 | Burges et al. | 707/103 R |
| 2007/0088727 A1* | 4/2007 | Kindig | 707/101 |
| 2007/0089057 A1* | 4/2007 | Kindig | 715/716 |
| 2008/0189330 A1* | 8/2008 | Hoos et al. | 707/104.1 |
| 2008/0288255 A1* | 11/2008 | Carin et al. | 704/256.1 |
| 2009/0006321 A1* | 1/2009 | Kaiser et al. | 707/2 |
| 2009/0071315 A1* | 3/2009 | Fortuna | 84/609 |
| 2009/0119734 A1* | 5/2009 | Deshpande et al. | 725/118 |

* cited by examiner

*Primary Examiner* — Jeffrey A Gaffin
*Assistant Examiner* — Adrian Kennedy

(57) ABSTRACT

A system for generating a media playlist comprising a media management module operable to select a first media item from a plurality of media items stored in a media database for playback; and using raw user input data representing a measure of the popularity of the first media item, generate preference data representing a refined user preference for the first media item; wherein the preference data is used to determine a second media item from the plurality of media items for playback.

14 Claims, 3 Drawing Sheets

SYSTEM FOR GENERATING A MEDIA PLAYLIST

BACKGROUND

Many individuals often have relatively large media item collections or libraries. Examples of media items comprise but are not limited to music, photographs and video. A media item can be reproduced using a suitable media playback device, which can also provide a user with an option of generating a media playlist comprising a sequence of media items for playback. For example, a media playlist can include a sequence of songs and/or a sequence of photographs and/or video clips which are presented to the user in a suitable format by the device.

In such a media playback device it is possible for a user to provide preferences representing preferred media items or types of media items. For example, a user can be provided with an option of manually tagging media items to reflect user interest in such media items. Such devices often generate media playlists based on the user preferences provided in the user provided tags. Difficulties in using a preference input device or user interface, or user preference consistency can sometimes cause user inputs to have an adverse effect on playlist generation.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

In support of media search and organization, gathering user metadata is one possible way to learn user preferences and to then adapt a system to provide a better user experience during interactions with the user. For example, an image viewing application can combine user inputs together with image analysis to find images similar to the user's favorites. Although infrequent, users may make errors in the metadata they input without being aware of the mistake. There is currently no way to recover from these errors, and current systems will then erroneously and blindly provide the user with undesired images that are in fact not preferred by the user.

According to an embodiment, there is provided a method for modeling user interactions in order to be resilient to user input errors. Herein, playlist refers to a sequence of media items, and not necessarily a physical embodiment of a complete list of the media, since a playlist can be generated on the fly, optionally stochastically, and in real-time one media item at a time. According to an embodiment, a playlist comprises a sequence of media items in the form of songs/musical pieces. Other alternatives are possible, for example a playlist can comprise a sequence which comprises a mixed selection of media items from a group consisting of music, video and still images.

Figure 1:
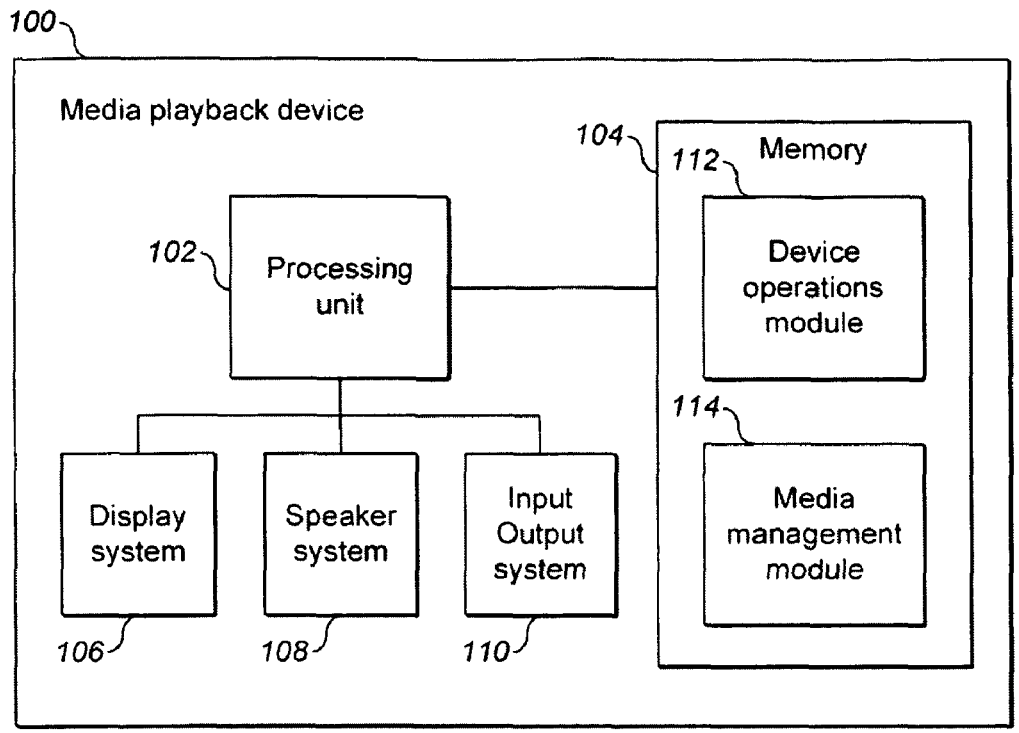
FIG. 1 is a block diagram representation of an example of a media playback device that may be used to implement an embodiment of selecting a media item for playback based on refined user preferences.

FIG. 1 is a block diagram representation of an example of a media playback device that may be used to implement an embodiment of selecting a media item for playback based on refined user preferences. The media playback device 100 generally stores a media collection. In one embodiment, the media playback device 100 can be placed in either a manual media selection mode or in an automatic media selection mode. When placed in manual media selection mode, a user selects a media item from the media collection and the media playback device 100 responsively plays back the user selected media item. When the media playback device 100 is placed in automatic media selection mode, the media playback device 100 selects a media item from the media collection or library for playback based on a refined version of user preferences entered by a user. Examples of the types of media items include, but are not limited to, audio media items, image media items and video media items.

The media playback device 100 generally comprises a processing unit 102 communicatively coupled to a memory 104, a display system 106, a speaker system 108 and one or more input and/or output systems 110. A device operations module 112 and a media management module 114 are stored in the memory 104. The device operations module 112 generally handles the media playback related operations of the media playback device 100. The media management module 114 performs a number of different functions. Following a playback of a media item from the media collection by the media playback device 100, the media management module 114 provides a user with the option of manually entering a user preference indicating whether the user likes or dislikes the media item. The media management module 114 stores the received raw user preference. A raw user preference comprises data representing a user's like or dislike of a media item. For example, a data value of binary 1 can indicate that a user likes an item, whereas a value of binary 0 can indicate that a user does not like an item. Other alternatives for encoding raw like and dislike preference data are possible. When the media playback device 100 is placed in automatic media selection mode, the media management module 114 processes the stored raw user preferences associated with media items previously played back for the user to generate refined user preferences associated with the previously played back media items. More specifically, the media management module 114 identifies possible errors in the user supplied raw user preferences and seeks to correct such errors to generate the refined user preferences. The media management module 114 selects a new media item that has not been previously played for the user from the media collection for playback based on the refined user preferences. Other modules that facilitate the operation of the media playback device 100 may also be stored in the memory 104.

The processing unit 102 generally includes a processor or controller. In an embodiment, display 106 is used to display image media items, such as for example photographs. According to an embodiment screen 106 is used to display video media items. According to an embodiment the speaker system 108 is used to enable playback of audio media items. According to an embodiment, the memory 104 includes one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices. The processing unit 102 generally retrieves and executes machine readable instructions or software programs that are stored in the memory 104.

While the use of a media playback device 100 has been described in connection with the selection of a media item for playback using refined user preferences, it should be noted that other type of devices, such as for example including, but not limited to, personal computers, mobile telephones and personal digital assistants may be used to generate the selection of a media item for playback based on refined user preferences. Accordingly, a suitable media playback device 100 can be any device suitable for selecting and playback of media items to a user for example.

In an embodiment, the media item is selected for playback based on refined user preferences in one device and the selected media item is provided to a media playback device for playback. The media playback device may be remote from the device used for input and/or determination of refined user preferences. For example, raw user preferences input to a media playback device can be sent to a remote server where refined user preferences can be determined. The raw preference and result (refined user preference) data can be communicated back to the media playback device over a wired or wireless internet connection of the device, which may or may not be the same connection used to communicate the raw data. For example, in a mobile station such as a mobile telephone, raw user preference data can be communicated to a remote server using any one of a mobile telephone network, wi-fi, or any other suitable long range radio frequency communication technology. Refined user preference data can be communicated back to the device using the same or a different one of the technologies mentioned.

Figure 2:
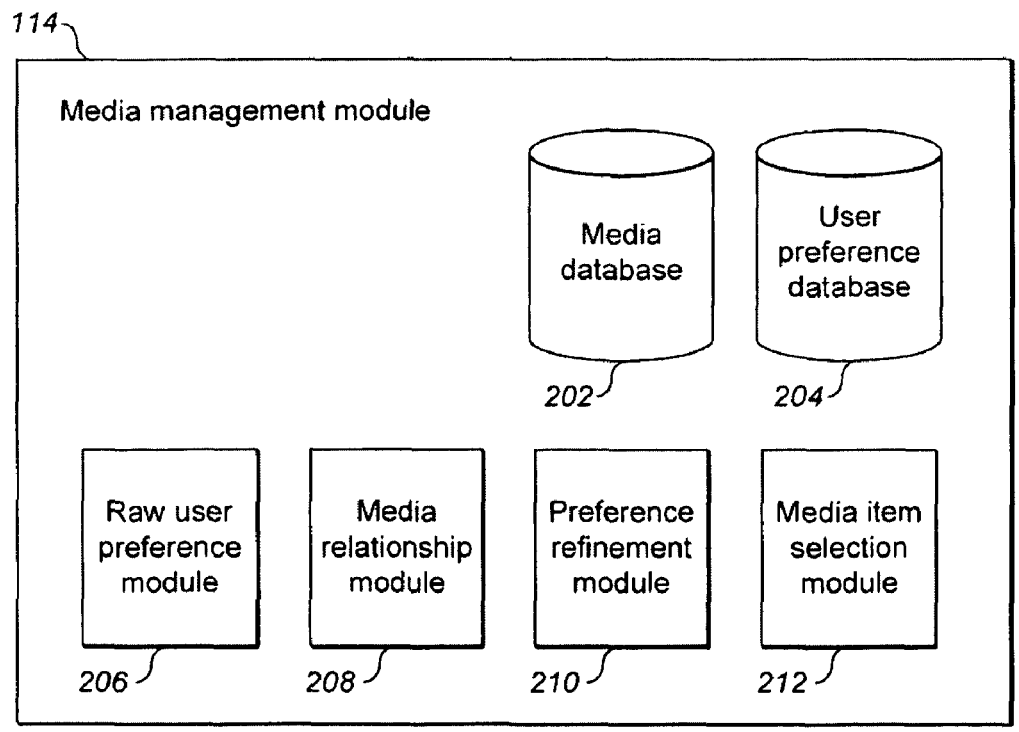
FIG. 2 is a block diagram representation of one embodiment of a media management module.

FIG. 2 is a block diagram representation of an embodiment of a media management module 114. The media management module 114 includes a media database 202, a user preference database 204, a raw user preference module 206, a media relationship module 208, a preference refinement module 210 and a media item selection module 212. The media items in the media collection are stored in the media database 202. The media playback device 100 accesses media items for playback from the media database 202. In one embodiment, new media items may be added to the media database 202. In one embodiment, existing media items may be removed from the media database 202. The raw user preferences and the refined user preferences are stored in the user preference database 204.

The user preference module 206 generally manages collection and storage of raw user preferences. When the media playback device 100 completes playback of a specific media item, the user is provided with the option of providing a user preference in order to indicate whether they liked or disliked the media item. According to an embodiment, a user's like or dislike of a media item is recorded in the form of a binary decision—that is to say a user can either indicate that they like or dislike a particular media item. According to an alternative embodiment, a user's like or dislike for a media item can take the form of a variable with greater than two values, for example, which can be used to encode varying degrees of like/dislike. Responsive to the receipt of the raw user preference, the user preference module 206 stores the received raw user preference in the user preference database 204. The user preference database 204 includes raw user preferences for each of media items from the media collection that have been played back for the user, where the user has provided a raw user preference. In one embodiment, a user is provided with the option of providing raw user preferences associated with a media item without an actual playback of the media item.

According to an embodiment, in a media collection including N media items, each media item in the media collection is assigned a designation $M_1$, $M_2$, $M_3$ . . . $M_N$. A raw user preference value $u_i$ is associated with each media item $M_i$, where the value of i specifies the media item in the media collection. The user preference module 206 assigns a value of 1 to the raw user preference variable $u_i$ if the user indicates that the user likes the media item $M_i$ and a value of 0 if the user indicates that the user does not like the media item $M_i$. According to an alternative embodiment in which varying degrees of like or dislike can be recorded by a user a value for $u_i$ can take the form of a value between 0 and 1 (0 encoding dislike, 1 encoding like, with degrees of like/dislike in between the two extremes). In order to enable a user to record such data, a slider (for example) can be provided on a media playback device, either embodied as hardware or software in the user interface.

The user preference module 206 stores the raw user preferences $u_i$ in the user preference database 202. The media relationship module 208 identifies similarities between each individual media item in the media collection with respect to the other media items in the media collection. The media relationship module 208 extracts a set of features for each media item in the media collection. In one embodiment, where the media items are music media items, the extracted features are numerical features. Examples of numerical features include, but are not limited to, tempo in beats per second, pitch in hertz and a numerical representation of purity. In one embodiment, the extracted features are categorical features. Examples of categorical features include, but are not limited to, jazz music, blues music, rock music, rap music, country western music and classical music. In one embodiment, the extracted features are a combination of numerical features and categorical features. In one embodiment, where the media item is a photograph, examples of extracted features include, but are not limited to, measures of brightness, texture amounts, saliency and color distribution or higher level features such as number of faces detected in the image, or whether the lighting appears to be natural or artificial, or a mixture.

The media relationship module 208 generates a feature vector for each media item in the media collection. The feature vector is based on the extracted features for each media item in the media collection. The feature vector provides measures that may be either automatically computed or derived by manual labeling of media. For example, the music features can be extracted by computations on the spectrogram of the media item in question, capturing characteristics roughly associated with beat strength, pitch, spectral timbre and tempo for example. A spectrogram for a media item can be created either with a series of bandpass filters, or from the time signal of the item using a short-time Fourier transform (STFT) as will be appreciated by those skilled in the art. For example, for a STFT the media item data, in the time domain, can be broken into overlapping portions and Fourier transformed to calculate the magnitude of the frequency spectrum for each portion.

The media relationship module 208 defines a relationship between each individual media item in the media collection with respect to each of the other media items in the media collection using the media item feature vectors. In one embodiment, the media relationship module 208 selects a media item and compares the feature vector for the selected media item with the feature vectors associated with each of the media items in the media collection. The media relationship module 208 generates data representing a weighted relationship between the selected media item and the other media items in the media collection. The media relationship module 208 repeats this process for every media item in the media database, or a selection of the media items (if, for example, the media collection is very large, a portion of the items can be compared, which portion can be randomly and automatically selected, or selected by a user). Alternatively, the media relationship module can perform a comparison of selected items incrementally until all items have been processed. Incremental comparison can be performed as media items are added and/or removed from the media collection.

According to an embodiment, one way to generate a weighted relationship is to connect or associate each media item to a certain number, three for example, of its closest media neighbors. A media item can be defined to be close to another media item if they share a certain proportion of the parameters used to define their respective feature vectors. The weights for these connections to the closest neighbors can be inversely proportional to the distance between the media items (that is to say, the closer the items are the larger the weights, i.e. the larger the number of feature vector parameters in common, the closer the media items are). There are different possible distance metrics that may be computed based on the feature vectors, such as Euclidean distance for example. The use of other distance metrics is possible. For example, the Mahalanobis distance, which is based on correlations between variables by which different patterns can be identified and analyzed can be used.

According to an embodiment, in order to determine what media to present to a user a graph structure is formed. Statistical inference algorithms are then applied, and every time there is a user input it can be used to determine the current user preferences which are used by the system to determine media to present to the user.

According to an embodiment, forming the graph structure comprises determining a set of features in the form of a feature vector for each media, and extracting said features in order to form media vector data representing features for the media item. The features can be numerical or categorical. They may be automatically extracted or manually extracted. Examples of numerical automatically extracted features for music include a measure of tempo (in beats per second for example), pitch, and purity as a numerical value. Other alternatives are possible as will be appreciated. For images, examples include measures of brightness, texture amounts, color distribution and saliency or higher level features such as number of faces detected or whether the lighting appears to be natural, artificial or a mixture for example.

Figure 3:
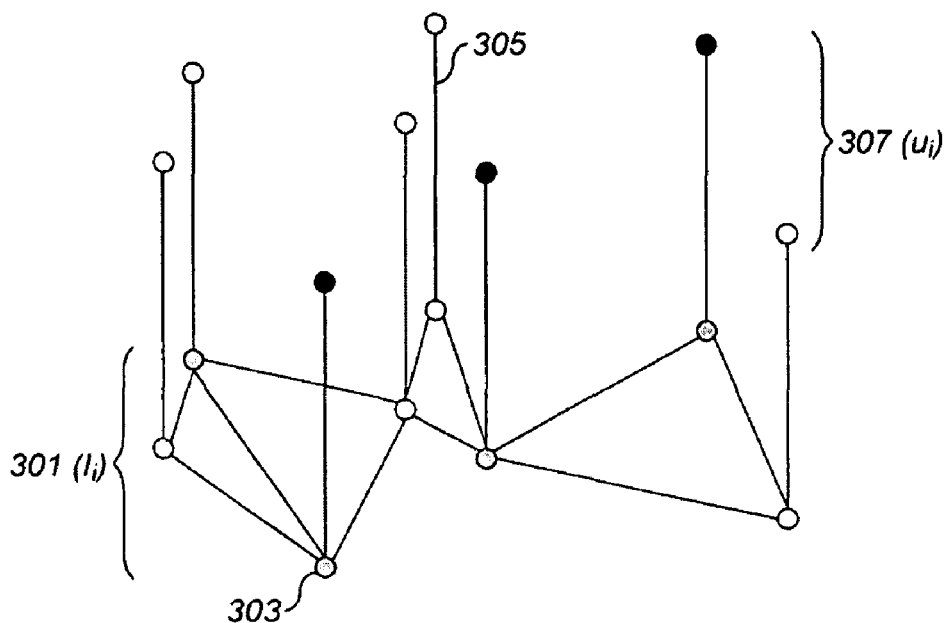
FIG. 3 is a graphical representation of a graph structure for user inputs.

FIG. 3 is a graphical representation of the one embodiment of relationships between media items and associated raw and refined user preferences is shown. The representation of FIG. 3 is depicted in the form of a graph structure, with nodes linked by edges. In one embodiment, the media relationship module 208 defines a node for each media item in the media collection.

Referring to FIG. 3 the bottom layer of the graph 301 is populated by generating a node 303 for each media item in a collection. Each node 303 (media item) is figuratively connected to media items that are similar to it. Similarity is a function that is defined for the set of vectors, for example by using Euclidean distance in the feature space. The bottom layer of the graph comprises weights that are a measure of how similar the media are to each other. According to an embodiment, there are potentially erroneous inputs $u_i$ for a subset of media items $M_i$ that the user has been presented with and provided inputs for. The subset for which inputs are available is shown in FIG. 3 as black circles. The bottom nodes in FIG. 3 comprise blank nodes corresponding to media that has not yet been presented to a user, and gray nodes corresponding to media that have already been presented to a user. The system subsequently conducts probabilistic inference on the graphical model to determine—for media that has not yet been presented (the blank nodes in the bottom layer of FIG. 3)—which has maximum probability of being preferred by the user. The media item with the determined maximum probability is presented to the user as the candidate media item.

For each node on the bottom layer, a vertical edge 305 is formed. The top nodes 307 connected to these edges represent the raw user inputs. Each variable $u_i$ refers to the raw user inputs. These can be the number of 'yes' or 'no' (i.e. 'like' or 'dislike' respectively) decisions for a media item, or a weighted input of preference for example.

The number of raw user inputs, $u_i$, grows in time since users keep providing additional inputs as the media is played back. Every time user inputs change, inference is applied to the graph to determine what it means about the user's "filtered" preference for the media. These are the variables $I_i$ 301 of FIG. 3, which are refined user inputs. User preference is therefore determined by way of an undirected probabilistic graphical model that includes the dependencies between the raw user inputs and the refined user inputs that are desired. The model also includes information from neighboring media so that user inputs for a nearby media can affect the results for the current media of interest.

Given the probabilistic model, the joint probability distribution for the entire set of variables being considered is given by $p(u_1, u_2, \ldots, u_N, I_1, I_2, \ldots, I_N)$ where the particular probabilities are given by weights along the edges of the graph in FIG. 3. The weights in the "horizontal" direction are a measure which describe the correlations in refined user inputs based on media similarity and the weights in the "vertical" direction are a measure which describe the correlation between raw user input and refined user input. For example, the weights in the horizontal direction will be larger if the media are closer and therefore more similar and smaller if the media are less similar and therefore more distant.

In an ideal case with no user errors, there would be perfect correlation between key presses and user preferences so that $u_i = I_i$ for all i. If there are errors, then marginalizing the joint distribution $p(u_i, I_i)$ results in: $p(I_i=j)=p(I_i=j|u_i=0)p(u_i=0)+p(I_i=j|u_i=1)p(u_i=1)$.

If the model for the user input errors is given by a binary symmetric channel between $u_i$ and $I_i$, then $p(I_i=1|u_i=1)=1)=1-e$, where e represents the channel's symbol error probability. If the channel has no errors, with e=0 the result reverts to the previously discussed situation where $u_i=I_i$.

Having just discussed the probabilistic model for the user input errors, now the process for forming the edges between refined user inputs $I_i$ is discussed. The edges are based on the similarities between media $M_i$. A fully connected similarity graph for all N media would be prohibitively expensive. According to an embodiment, a practical solution is to first form for each node in the bottom layer of the graph as shown in FIG. 3 an edge between the $I_i$ (where each $I_i$ corresponds to a media item $M_i$) that corresponds to the k nearest neighbors of the media item $M_i$. To have a valid undirected graphical model based on cliques (subsets of fully connected nodes), the graph just formed has added to it the additional edges needed to complete the cliques. The weights on the edges then correspond to the media item similarities. In this way, the user inputs influence each other, corresponding to the intuition that if the user liked a media, then similar media is also probably liked. The inference mechanisms then fill the probabilities for those media that the user has not yet expressed preference for.

It is known to apply inference techniques on generated graph structures such as that depicted in FIG. 3 in order to select preferred media for the user. According to an embodiment, a sum-product message passing algorithm for example is efficient to implement on the sparse graph shown in FIG. 3. The inference would take place after a prior training step that determines the probability of error characteristics of the user.

Using existing techniques from inference from these graphs, one can find $p(I_1, I_2, \ldots, I_N | u_1, u_2, \ldots u_N)$ in general, or more in particular, we can also marginalize to find $p(I_i | u_1, u_2, \ldots, u_N)$. The typical technique used for this is called the sum-product algorithm, and it is efficient in factor graphs and undirected graphs which can be converted to factor graphs. The sum-product algorithm takes advantage of the fact that the joint probability distributions, when represented as graphs, already have—because of their structure—built in conditional independence assumptions that allow the efficient computation of the probabilities (which would otherwise be computationally very complex to calculate). Because of this, the joint probability distribution can be broken down into terms (or factors) at each node of a factor graph. The graph structure then allows the use of the existing art sum-product algorithm that computes the required probabilities by conducting only local operations at each node of the factor graph. These local operations include the step of computing the product of incoming messages to a node from adjacent nodes. The subsequent step computes sums that marginalize the distribution and leave only the relevant probability variable. These local computations are done starting at leaf nodes and propagating throughout the nodes of the graph. The local computations are quick to compute and they are exact on chains. For graphs that are not chains, the algorithm is iterative, but each step is still a sum-product step as described above. Such graphical models are described in Chapter 8 (pp 359-422) Pattern Recognition and Machine Learning, Christopher M. Bishop, (2002-2006), Springer, 2006, and in particular chapter 8.4.4 (pp 402-411), the contents of which are incorporated herein in their entirety by reference.

This algorithm gives a marginal probability $p(I_i | u_i, u_2, \ldots, u_N)$ that can either be fed directly to the classification system that provides "next media", for example or thresholded before inputting into the "next media" algorithm. For example, if the marginal probability is >0.5 we can decide that the refined user input expresses a preference for media I, even if the raw user inputs do not show such preference. In this way, more robust inferences about user preferences can be derived.

Figure 4:
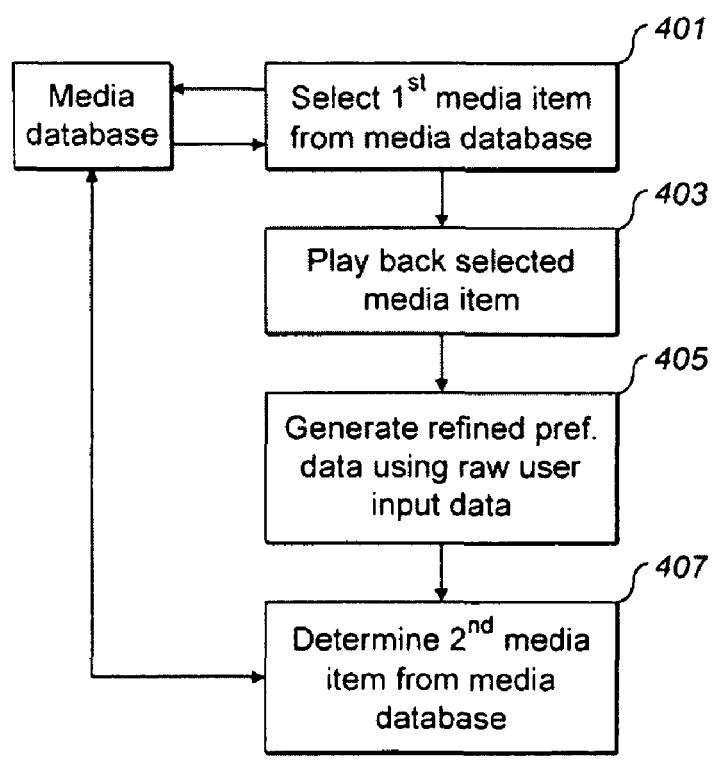
FIG. 4 is a flow chart depicting selection of a media item according to an embodiment.

FIG. 4 is a flow chart depicting selection of a media item according to an embodiment. At step 401 a media management module operable to select a first media item from a plurality of media items stored in a media database for playback selects a first media item. The media item can be played back to a user using a media playback device such as those described above. The media management module can be part of the media playback device or can be part of a system which is remote from the media playback device, as described above. The media database can be stored in storage which is part of the media playback device. Alternatively, the database can be stored in a storage location which is remote from the playback device. For example, the remote storage location can be a server which is operable to store media items for a user or a service provider who distributes or otherwise provides media items for users. The storage location can comprise one or more storage locations adapted to enable the supply of suitable media items to a plurality of users or suppliers.

The selected first media item is played back to a user using the media playback device at step 403. The playback device can be any conventional device which is capable of presenting information to a user in the form of visual and/or audible content for example, and as such will be familiar to the skilled artisan. The media playback device further comprises a control which can be implemented in hardware or in software in the form of part of a graphical user interface for example. The control is adapted to enable a user to input data to the device representing a like or dislike of the media item which is or was just played back to the user. For example, during playback, a user can use the control to indicate a preference for the media item being played back. Alternatively, after the media item has been played back, the user can use the control to indicate a preference of the media item. Alternatively, a media playback device can comprise one or more sensors, such as biometric sensors for example which are adapted to sense a change in certain ones of conditions of a user and generate reaction data indicative of the change. For example, like or dislike of a media item may elicit a response from a user which can be detected by one or more sensors, such as for example increased heartrate, or a change in skin conductivity.

According to an embodiment, the preference which is input to the device by the user forms raw user preference data. Accordingly, at step 405 the raw user preference data representing a measure of the popularity of the first media item is used to generate preference data representing a refined user preference for the first media item. According to an embodiment, the preference data is generated using the method as described above with reference to FIG. 3. The raw user preference data is used in an undirected probabilistic graphical model that includes the dependencies between the raw user inputs and the refined user inputs that are desired. The model also includes information from neighboring (to a first media item) media items so that user inputs for a nearby media can affect the results for the current media of interest.

Accordingly, at step 407 the preference data is used to determine a second media item from the plurality of media items for playback. The second media item is therefore that which is selected from a media database as one which has a higher probability of being preferred by a user based on the users like or dislike of previous media items which have been presented to the user. The media playback device can be programmed to prevent the situation in which a user is presented with the same media item on numerous occasions and/or within a predetermined time frame.

Figure 5:
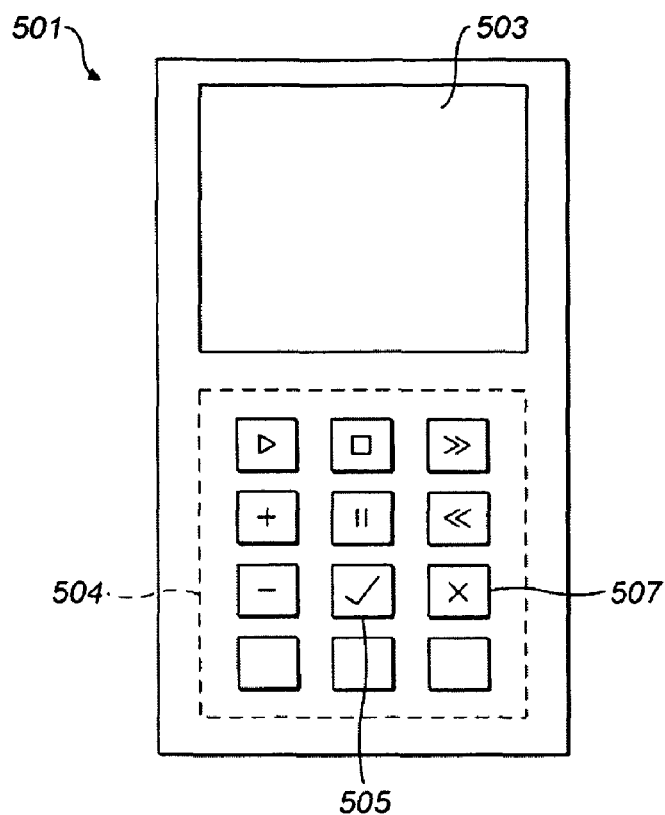
FIG. 5 is a schematic representation of a media playback device according to an embodiment.

FIG. 5 is a schematic representation of a media playback device according to an embodiment. The device 501 comprises a display 503 which can be any conventional display such as an LED, LCD or OLED for example which is capable of reproducing media content in the form of images (either still or moving) for a user. The device further comprises a set of control buttons 504. Such controls can take numerous forms as will be appreciated by those in the art. For example, the controls 504 can be mechanical buttons/switches, or can be provided using a touch sensitive screen for example, such that the controls can be tailored in software for a specific function of the device 501.

According to an embodiment, device 501 comprises controls 505, 507 for allowing a user of the device to input preference data. For example, button 505 can be used to indicate like of a particular media item, whereas button 507 can be used to indicate dislike of a particular media item. The position of the buttons 505, 507 or any of the other controls or the display of device 501 is not intended to be limiting. It will be appreciated that the device 501 can comprise many other functional components, such as the provision of input ports for headphones and/or connection to an external device such as a personal computer, as well as comprising functional modules for enabling the device to communicate using a wireless communication protocol such as one of the IEEE 802.11 protocols for example.

Figure 6:
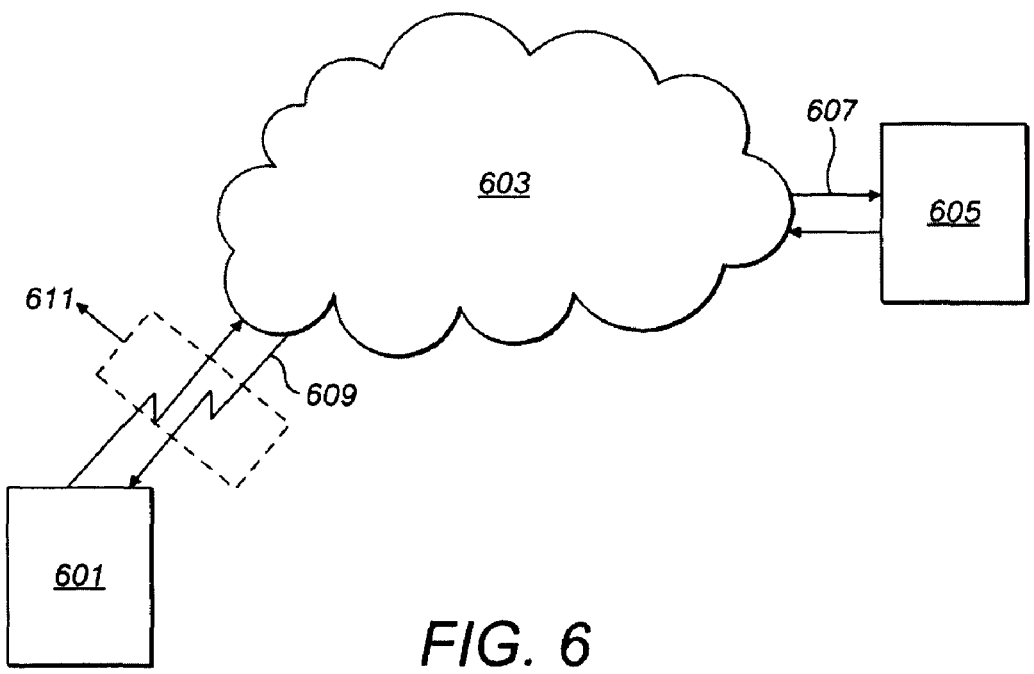
FIG. 6 is schematic representation of a method of providing content in the form of media items to a device.

FIG. 6 is schematic representation of a method of providing content in the form of media items to a media playback device 601. According to an embodiment, device 601 can store media items and, as such, provide a playlist for a user without needing to communicate to a remote device. Alternatively, as shown in FIG. 6, device 601 can communicate with a remote device 605. Device 605 can be a server, for example, which is operable to store a collection of media items in the form of a media database. In this regard device 601 need not store any media items locally, but can stream or otherwise download content from device 605. Communication between devices 601 and 605 can be effected via the internet or another network as depicted generally by 603. Communication 609 between device 601 and the network 603 can be wired or wireless. Communication 607 between network 603 and device 605 can be wired or wireless, but is more likely to be wired as is customary for a server, for example.

A communications protocol 611 used by device 601 can be any suitable protocol, such as 802.11 or Bluetooth. Alternatively, the protocol 611 used for communication 609 can be a mobile telephone network connection such as GMS, GPRS, 3G for example. Other alternatives a possible.

It should be noted that while systems implemented using software or firmware executed by hardware have been described above, those having ordinary skill in the art will readily recognize that the disclosed systems could be implemented exclusively in hardware through the use of one or more custom circuits, such as for example, application-specific integrated circuits (ASICs) or any other suitable combination of hardware and/or software.

The illustrations of the embodiments described herein are intended to provide a general understanding of the structure of the various embodiments. The illustrations are not intended to serve as a complete description of all of the elements and features of apparatus, devices and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is to be understood that the above-referenced arrangements are illustrative of the application of the principles disclosed herein. It will be apparent to those of ordinary skill in the art that numerous modifications can be made without departing from the principles and concepts of this disclosure, as set forth in the claims below.

What is claimed is:

1. A system for generating a media playlist comprising:
    a computer-readable medium storing computer-readable instructions; and
    a data processor coupled to the memory, operable to execute the instructions, and based at least in part on the execution of the instructions operable to perform operations comprising:
        selecting a first media item from a plurality of media items stored in a media database for playback;
        based on raw user input data representing respective measures of popularity of the first media item and one or more other media items, generating preference data representing refined user preferences for the first media item and one or more other media items, wherein the generating comprises inferring the preference data based on a probabilistic graphical model comprising measures of correlation between the raw user input data and respective ones of the refined user preferences and measures of correlation between respective ones of the refined user preferences; and
        based on the preference data, determining a second media item from the plurality of media items for playback.

2. A system as claimed in claim 1, wherein raw user input data is generated by the system in response to an indication by a user of the system of preference for the first media item.

3. A system as claimed in claim 2, wherein preference data is generated using the raw user input data by:
    generating graph data representing a graph structure for media items in the media database, respective media items represented as first nodes of the graph structure;
    generating media vector data representing a feature vector for respective ones of the media items, the media vector data comprising a measure for one or more features of respective ones of the media items;
    connecting selected ones of the first nodes based on the media vector data to provide a set of so connected similar media items.

4. A system as claimed in claim 3, wherein the measure for one or more features of the media items comprises a numerical or categorical parameter.

5. A system as claimed in claim 3, wherein the measure for one or more features of the media items is automatically extracted from metadata associated with respective ones of the media items.

6. A system as claimed in claim 3, wherein the measure for one or more features of the media items is manually input for respective ones of the media items.

7. A system as claimed in claim 3, further comprising:
    using the media vector data to determine a similarity function for respective ones of the media items based on a Euclidean distance measure in a feature space for the media items, the function defining a measure of the similarity of respective ones of the media items.

8. A system as claimed in claim 3, further comprising:

associating a first node with the raw user input data for the media item of the first node; and selecting said second media item from the media database by inferring a preferred media item using message passing to determine a marginal distribution for a node representing the second media item.

9. A method for generating a playlist, comprising by a computer system:

receiving raw user input data representing respective measures of popularity of respective media items;

determining respective media vector data representing a set of parameters for respective ones of the media items;

based on the media vector data, determining measures of correlation between respective ones of the media items with one another in order to form a linked set of media items representing a group of related media items;

inferring the preference data representing refined user preferences for respective ones of the media items based on a probabilistic graphical model comprising measures of correlation between the raw user input data and respective ones of the refined user preferences and respective ones of the measures of correlation between respective ones of the refined user preferences;

selecting a first respective one of the media items for inclusion in the playlist; and based on the preference data for the first selected media item, determining another one of media items.

10. A method as claimed in claim 9, wherein associating respective ones of the media items comprises:

using the media vector data for a media item to determine a set of similar nearest neighbors for the media item.

11. A method as claimed in claim 9, further comprising:

generating a maximum probability for the second media item using the preference data and the media vector data by conducting probabilistic inference.

12. A method as claimed in claim 11, wherein generating a maximum probability further comprises:

for a media item which has not been presented to a user, using media vector data and preference data associated with the item to determine a probability of user preference for the item; and repeating for a set of media items within the set of nearest neighbors for the media item in order to determine the maximum probability of user preference within the set.

13. A media playback device suitable for use in the system as claimed in claim 1.

14. A media playback device as claimed in claim 13, further comprising at least one user control adapted to enable a user to input raw user data.

* * * * *

UNITED STATES PATENT AND TRADEMARK OFFICE
CERTIFICATE OF CORRECTION

PATENT NO. : 8,386,413 B2  
APPLICATION NO. : 12/492558  
DATED : February 26, 2013  
INVENTOR(S) : Ramin Samadani Page 1 of 1

It is certified that error appears in the above-identified patent and that said Letters Patent is hereby corrected as shown below:

In the Claims

In column 11, line 25, in Claim 9, after "selecting a" delete "first".

Signed and Sealed this  
Fourth Day of June, 2013

Teresa Stanek Rea  
*Acting Director of the United States Patent and Trademark Office*